Feb. 13, 1962 P. SCHAURTE 3,020,987
METHOD OF AND MEANS FOR FORMING WELDING CONNECTIONS BETWEEN
METALLIC BODIES OF DIFFERENT WELDING CHARACTERISTICS
Filed Feb. 27, 1958 2 Sheets-Sheet 1
FIG. 1
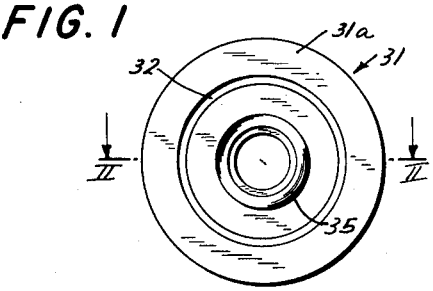
FIG. 6
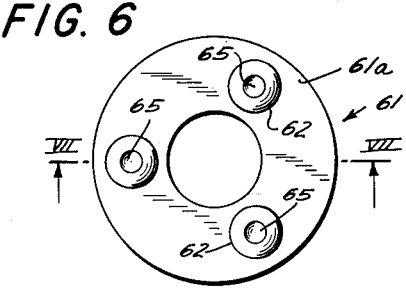
FIG. 2
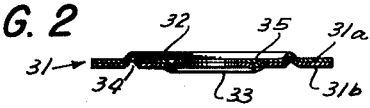
FIG. 7
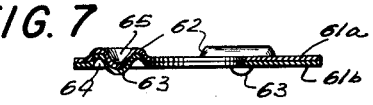
FIG. 3
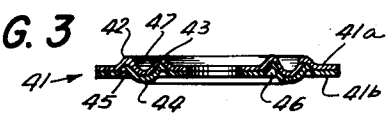
FIG. 8
FIG. 9
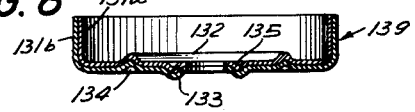
FIG. 4
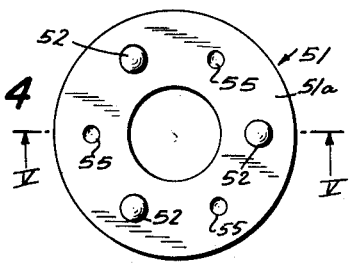
FIG. 10
FIG. 11
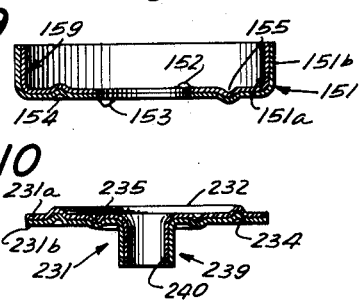
FIG. 5
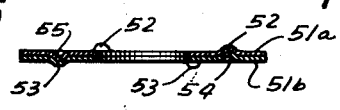
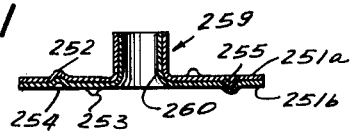
FIG. 12
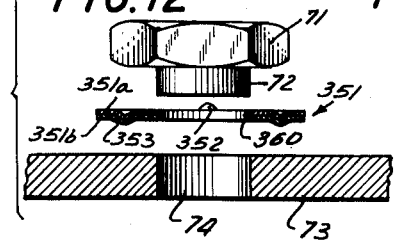
FIG. 13
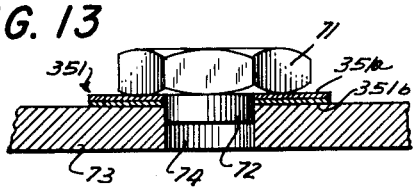
INVENTOR
Paul Schaurte
BY Michael S. Striker
ATTORNEY Feb. 13, 1962  P. SCHAURTE  3,020,987
METHOD OF AND MEANS FOR FORMING WELDING CONNECTIONS BETWEEN
METALLIC BODIES OF DIFFERENT WELDING CHARACTERISTICS
Filed Feb. 27, 1958  2 Sheets-Sheet 2

INVENTOR
Paul Schaurte
BY Michael S. Striker
ATTORNEY 3,020,987
METHOD OF AND MEANS FOR FORMING WELDING CONNECTIONS BETWEEN METALLIC BODIES OF DIFFERENT WELDING CHARACTERISTICS
Paul Schaurte, Vaduz-Bartlegrosch, Liechtenstein
Filed Feb. 27, 1958, Ser. No. 718,040
Claims priority, application Germany Aug. 20, 1957
8 Claims. (Cl. 189—36)

The present invention relates to improvements in the art of forming permanent connections between metallic bodies, and more particularly to a method of joining such bodies by welding, as well as to means for facilitating welding of bodies consisting of metallic materials which are not easily weldable to each other.

It is already known to provide a number of protuberances on the surfaces along which a weld between two easily weldable metallic elements is desired. For example, if a nut must be welded to a flat metallic body, the protuberances are formed on that surface of the nut which is thereupon apposed to the flat surface of the other element. The manufacture of such nuts is rather costly since special tools and machines are necessary especially if the material of the nut is stainless steel, it being known that cold forming of articles made of stainless steel is a rather difficult procedure. Moreover, as it is necessary to maintain a supply of regular as well as of specially formed "welding nuts," the costs for storage, too, are increased.

The difficulties increase considerably if it is desired to form a welding connection between two metallic elements made of such metals or alloys which are not easily weldable to each other. In such instances, even a costly and time-consuming pretreatment of surfaces along which the metallic elements must be joined cannot bring about a satisfactory welding connection.

Accordingly, it is the primary object of this invention to provide a method of and means for forming a welding connection between two metallic bodies made of such metals and/or alloys which are not easily weldable to each other.

Another object of the invention is to provide a method of and means for forming a connection by welding in spots between two plane-surfaced metallic bodies which cannot be welded directly to each other.

A further object of my invention is to provide connecting means insertable between the adjacent surfaces of two metallic elements whose materials are so selected as to facilitate a welding connection between the metallic elements even though the materials of the elements themselves cannot be welded to each other.

An additional object of the invention is to provide connecting means of the character above set forth which are cheap in manufacture and may be used to form welding connections between two metallic bodies of different sizes and shapes.

A still further object of my invention is to provide an improved welded structure consisting of a pair of elements made of such metals or alloys which are not easily weldable to each other, and of the novel connecting means therebetween.

The above-mentioned and many other objects of my invention are attained by the provision of one- or two-piece connecting member which consists of two metals or alloys of different welding characteristics. For example, the connecting member may consist of a layer of aluminum and a layer of sheet metal. The layers may be integrally connected by laminating same into a single sheet, one half of the sheet with an exposed surface being made of aluminum, and the other half with the other exposed surface of sheet metal. If no lamination is desired, the two components may be provided with suitable apertures and protuberances so disposed that the protuberances of one component extend through the apertures in the other component, and vice versa. In this manner, one obtains a composite article in which the projection or projections of one metal or alloy extend beyond the exposed surface of a member made of another metal or alloy, the metals or alloys being of different welding characterisitcs. Thus, the connecting member made of laminated or merely apposed aluminum and sheet-metal layers may be employed for forming welding connections between nuts made of stainless steel and aluminum plates. If the connecting member is a single laminated sheet, its aluminum layer is placed adjacent to the aluminum plate, while the sheet metal layer extends adjacent to the nut. By providing the connecting member with suitable protuberances at both of its major surfaces, it may be welded in spots to the adjacent surfaces of the nut and of the aluminum plate by the well known electric resistance welding process.

If, on the other hand, the connecting member is a composite article, the projecting portions of its aluminum component which extend through suitable apertures in the sheet metal layer are placed into contact with the aluminum plate, and the projections of its sheet metal component are brought into abutting relationship with the nut. The welding in spots is then carried out in the customary fashion.

The novel connecting member is particularly suitable for forming permanent connections between plane-surfaced metallic bodies of different welding characteristics even though the field of application of the laminated article is much broader and, by suitably shaping same, may be employed wherever and whenever a welding connection between two articles of not easily weldable metals or alloys is desired.

When used for spot welding, the protuberances on the prevalently flat, preferably discoid article may be formed in a number of ways. For example, selected zones of the laminated article or of both components of a composite connecting member may be corrugated to form annular ridges, or concave or otherwise shaped depressions may be sunk into one surface of the article or its components to form convex or similar protuberances at its other side.

The invention, in its broadest aspects, can be stated to reside in the recognition that a satisfactory welding connection may be formed between two articles made of such metals or alloys which are not easily weldable to each other by inserting therebetween a single or composite connecting member consisting of two different metals or alloys so selected that the metal or alloy of one component of the connecting member is easily weldable to the metal or alloy of one of the articles to be connected by welding, and that the metal or alloy of the other component of the novel connecting member is easily weldable to the material of which the other article is made.

If a connection by welding in spots is desired between two plane-surfaced metallic bodies, the laminated or composite connecting member is preferably made of uniform thickness and is stamped in intaglio so that a protuberance formed at one of its sides defines a depression or recess at the other side. To provide optimum conditions for a good welding connection, it is advisable to so select the protuberances that those at one side differ in size from the protuberances at the other side of the laminated or composite article.

Various other objects, features and attributes of my invention will become apparent and will be pointed out in greater detail in the course of the following description of certain embodiments of the novel connecting member selected for illustration in the accompanying drawings wherein:

FIG. 1 illustrates a discoid laminated connecting member having annular corrugations which define a single concentric ridge at each side of the article;

FIG. 2 is a section taken on line II—II of FIG. 1;

FIG. 3 is a similar section through a discoid laminated connecting member so corrugated as to define two ridges at one and a single ridge at the other side thereof;

FIG. 4 is a plan view of a modified laminated member which is provided with individual, spaced, convex protuberances extending beyond both of its major surfaces;

FIG. 5 is a section taken on line V—V of FIG. 4;

FIG. 6 is a plan view of a further modification which is formed with annular ridges at the one and with individual convex protuberances at the other side thereof;

FIG. 7 is a section taken on line VII—VII of FIG. 6;

FIG. 8 is a section through a laminated connecting member having a peripheral flange of cylindrical contour and a base similar to the article shown in FIGS. 1 and 2;

FIG. 9 is an axial section through a cup-shaped connecting member also formed with a peripheral flange and having a base similar to the member shown in FIGS. 4 and 5;

FIG. 10 is a section through a further modification illustrating a laminated connecting member having a base portion corrugated as the article shown in FIGS. 1 and 2, and a concentric cylindrical collar surrounding an axial bore;

FIG. 11 shows in central section an article similar to that of FIG. 10 with the exception that the projections in its base are of convex shape;

FIG. 12 is exploded view of a collared nut and, in section, of a metallic plate and a slightly modified laminated connecting member in position preceding spot welding;

FIG. 13 shows the elements of FIG. 12 after spot welding;

Figure 15:
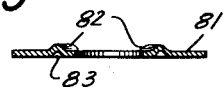
FIG. 15 is a section taken on line XV—XV of FIG. 14.
Figure 14:
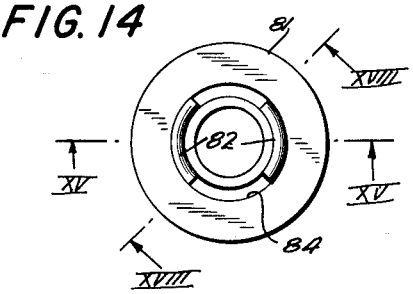
FIG. 14 shows in plan view a first component of a composite connecting device which latter is not laminated.
Figure 16:
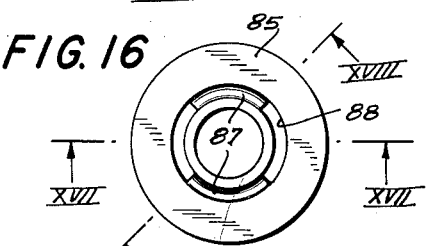
FIG. 16 is plan view of the second component of the composite non-laminated connecting device.

FIGS. 1 and 2 illustrate a laminated connecting member 31 comprising, for example, a layer 31a of sheet metal and another layer 31b of aluminum. Laminated member 31 is of discoid shape and has annularly disposed corrugations defining a ridge 32 extending beyond the exposed surface of its sheet metal component 31a, and a ridge 33 at its other major surface. Ridges 32, 33 are formed by sinking annular recesses or furrows 34, 35, respectively, into the opposing surfaces of laminated article 31.

FIG. 3 shows a similar member 41 of discoid shape whose annular corrugated zone comprises a pair of concentric annular ridges 42, 43 at the exposed surface of the, say, sheet metal component 41a, and a single ridge 44 extending beyond the exposed surface of the other, say, aluminum component 41b. Due to uniform thickness of laminated member 41, ridges 42, 43 and 44 define annular recesses or furrows 45, 46 and 47, respectively.

A slightly modified composite connecting member 51 is shown in FIGS. 4 and 5. Annular ridges are replaced by a number of spaced convex protuberances 52 extending beyond the exposed surface of the, say, sheet metal lamination 51a, and similar protuberances 53 project from the exposed surface of the, say, aluminum component 51b. Protuberances 52 and 53, which are disposed on the periphery of a circle concentric with the discoid connecting member 51, define concave depressions 54, 55, respectively, in the opposing surfaces of the novel article.

According to FIGS. 6 and 7, the composite connecting member 61 consists of laminations 61a, 61b which, too, may be of sheet metal and aluminum, respectively, or of any other kind of metal or alloy, provided that they are easily weldable to the metal or alloy of elements which must be welded to laminations 61a and 61b, respectively. As shown, three annular protuberances 62 extend beyond the exposed surface of lamination 61a, and convex protuberances 63 project from the free surface of lamination 61b. Each annular ridge surrounds a convex depression 65 and, due to uniform thickness of member 61, an annular recess 64 is formed and surrounds each protuberance 63.

If it is desired that the novel article at least partially surround or receive one of the elements to which it is welded in spots, a modified connecting member, for example, such as shown in FIGS. 8 and 9, is being used. According to FIG. 8, the laminated member 131 has a substantially plane base similar to member 31 shown in FIGS. 1 and 2, and a peripheral flange 139. Concentric ridges 132, 133 define concentric channels or recesses 134, 135, respectively, in the opposing exposed surfaces of member 131, the latter consisting of laminations 131a, 131b manufactured of different metals or alloys.

Cupped member 151 of FIG. 9 has a peripheral flange 159 and a discoid base similar to the article shown in FIGS. 4 and 5. Each of projections 152, 153 defines a concave depression 154, 155 in the exposed surfaces of respective laminations 151b, 151a.

A further modification of the novel connecting member is shown in FIGS. 10 and 11. This form is employed when it is desirable that a portion of the connecting member extend into a recess or a bore in one of the elements to which the connecting member is welded.

In FIG. 10, the novel article 231 comprises a washer-like generally plane base and a cylindrical collar 239 surrounding a coaxial bore 240. Concentric ridges 232, 233 and corresponding recesses 234, 235 are formed as above described in connection with elements 31 and the base of element 131 shown, respectively, in FIGS. 1, 2 and 8. Member 231 consists of laminations 231a, 231b which, too, may be made of sheet metal and aluminum, respectively.

In FIG. 10, connecting member 251, consisting of laminations 251a, 251b, has a number of convex protuberances 252, 253, concave depressions 254, 255, and a concentric cylindrical collar 259 which latter surrounds an axial bore 260.

If it is desired to connect a stainless steel nut 71 (see FIGS. 12 and 13) with an aluminum plate 73, one can employ a washer-like connecting member 351 which consists of a sheet-metal lamination 351a adjacent to the nut 71, and of an aluminum lamination 351b which is adjacent to the plate 73 of same material. As shown, nut 71 has a cylindrical extension 72 which passes through a bore 360 in member 351 and extends into aperture 74 in the aluminum plate 73. When the collared nut 71 is employed, it is advisable to so select the axial length of its collar 72 as to exceed the combined height of protuberances 352, 353 and the thickness of laminated member 351. Protuberances 352, 353 indicate the spots where the connecting member 351 is permanently connected to the respective members 71 and 73 in the subsequent electric resistance welding process. The finally assembled and welded-together article is illustrated in FIG. 13.

It will be understood that, even though FIGS. 1 to 13 illustrate circular, annular, flanged or collared welding connectors, the laminated article may assume many other shapes. Thus, it may be so formed as to serve other purposes in addition to connecting two metallic elements by welding. For example, the cupped portion of the novel element (see FIGS. 8 and 9) may be extended beyond one of the articles welded thereto to serve as a receptacle for the end of a shaft or axle, especially if one of the members welded thereto acts as a guide or bearing for same. In cases when one of the welded-thereto members must be attached to another structure by means of a spring or the like, the laminated connecting member may be provided with an aperture or hook to serve as one terminal for the resilient element.

It will also be understood that the novel element may be formed with a flange and with a collar as well so as to receive one and to extend into the other of the welded-thereto members.

Moreover, the protuberances at one or both sides of the laminated article may be of any desired shape as they need not necessarily be annular, convex or concave. Obviously, the circular shape of the connecting member may be replaced by a rectangular or other design, and the flanges or collars may be interrupted or further deformed, if necessary. The elements connected by welding with the laminated member may be made of any metal or alloy, as well as the laminations of the connecting member itself, as long as the material of the laminations is easily weldable to the material of which the one or the other of the elements connected thereby is made.

Referring now to the embodiment shown in FIGS. 14 to 18, the one-piece laminated structure heretofore described in connection with FIGS. 1 to 13 is replaced by a pair of separate members 81 and 85 which may be assembled so that isolated portions of one member extend through and beyond the exposed surface of the other member, and vice versa.

Connecting member 81 is of discoid shape and has annularly disposed arcuate ridges 82 alternating with arcuate cutouts 84. Ridges 82 are formed by sinking arcuate grooves or furrows 83 into the opposing surface of member 81. It will be noted that protuberances 82 are all adjacent to the same major surface of the discoid member 81, its other surface being generally plane.

The other member 85, of a metal not easily weldable with the metal of member 81, is of identical construction. Thus, ridges 86 extending beyond one major surface of member 85 alternate with arcuate cutouts 88, the ridges being formed by sinking channels 87 into the opposing surface of the discoid article.

Figure 17:
FIG. 17 is a section taken on line XVII—XVII of FIG. 16.
Figure 18:
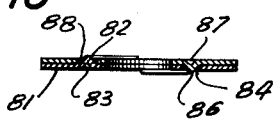
FIG. 18 is a section of the assembled connecting device, the sections through its components being taken on lines XVIII—XVIII in FIGS. 14 and 16, respectively.
Figure 19:
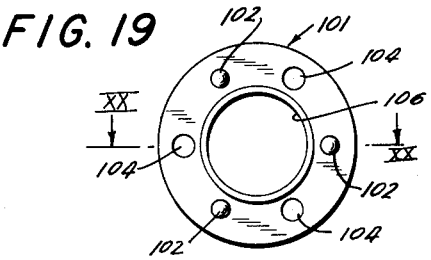
FIG. 19 shows in plan view the first component of a modified composite connecting device, the component having a concentric cylindrical flange extending from the discoid body portion of the article.
Figure 20:
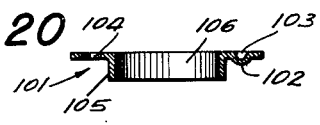
FIG. 20 is a section taken on line XX—XX of FIG. 19.
Figure 21:
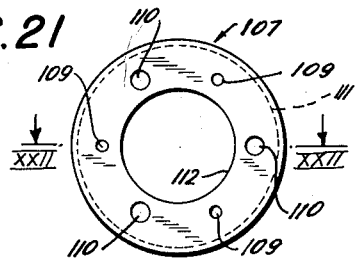
FIG. 21 illustrates the component complementary to that shown in FIGS. 19 and 20, this component having a peripheral flange of cylindrical contour.
Figure 22:
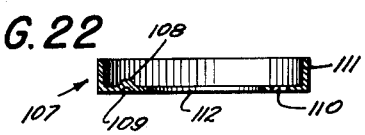
FIG. 22 is a section taken on line XXII—XXII of FIG. 21.

When assembled, members 81 and 85 are in the relative position shown in FIG. 18. Protuberances 82 of member 81 extend through the cutouts 88 in member 85 and, inversely, protuberances 86 of member 85 extend through the arcuate cutouts 84 in member 81. The crests of projections 82 and 86 adjacent to the flat surfaces of members 85 and 81, respectively, indicate the spots at which the members are welded to the plane surfaces of two elements, say a nut and a plate, which latter are made of two metals or alloys not easily weldable to each other. It will be noted that the section of FIG. 18 is taken on lines XVIII—XVIII in FIGS. 14 and 16, i.e. on lines inclined through 45 degrees with respect to the lines on which the sections of FIGS. 15 and 17 are taken.

In the embodiment shown in FIGS. 19 through 23, the first connecting member 101 has a washer-shaped body with a concentric bore 106 surrounded by a cylindrical collar 105. Disposed on the periphery of a concentric circle in the flat body of member 101 are convex protuberances 102 and circular apertures 104, all protuberances extending beyond one major surface of member 101. As in the previously described embodiments, protuberances 102 are formed by sinking concave depressions 103 into the opposing surface of metallic member 101.

The second connecting member 107 has a flat annular body portion defining a concentric aperture 112 and a cylindrical peripheral flange 111. Convex protuberances 108 alternate with circular apertures 110. Again, the protuberances 108 are all adjacent to one major surface of cupped member 107 and are formed by sinking concave depressions 109 into the opposing surface of the said member. It will be noted that collar 105 and protuberances 102 as well as flange 111 and protuberances 108 all extend from the same major surface of members 101 and 107, respectively.

Figure 23:
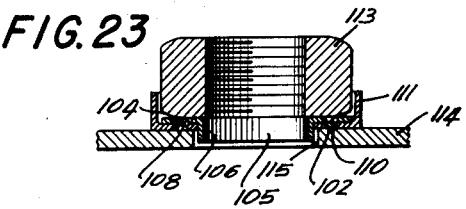
FIG. 23 is a central section of the component parts shown in FIGS. 19 to 22 disposed between a nut and a plate made of metals or alloys having different welding characteristics.

The apertures 104 and 110 are so disposed and are of such size as to accommodate protuberances 108 and 102, respectively, when members 101 and 107 are placed side by side as shown in FIG. 23. When so assembled, the peaks of protuberances 102 and 108 project beyond the adjacent major surfaces of members 107 and 101 to indicate the spots at which these connecting members are welded to a nut 113 and a plate 114, respectively. Annular flange 111 receives a portion of the nut 113 and the collar 106 of member 101 extends into a bore 115 provided in member 114. In this manner, the nut 113 may be rigidly secured by spot welding with respect to plate 114 even though the metals or alloys of which these articles are made cannot be welded to each other without costly and time-consuming pretreatment. For example, plate 114 may be made of copper and the nut 113 of stainless steel. Consequently, member 101, connected in spots by electric resistance welding, is made of copper and the other member 107 is made of steel.

It will be readily understood that the pairs of connecting members 81, 85 or 101, 107 may assume any other suitable shape, as well as that the number, configuration and disposition of their protuberances and openings may be varied within a very broad range. Thus, only two convex projections may be provided on members 101, 107, or the number of arcuate ridges on members 81, 85 may be reduced to one or increased to three or more. Finally, the connecting members may be manufactured of a wide variety of metals or alloys, such selection being made with a view to use a metal or alloy which is easily weldable with the material of which the one or the other member to be connected is made.

What I claim and desire to protect by Letters Patent is:
1. A welded structure comprising, in combination, a first member made of a metallic material and having a bottom surface; a second member having a top surface slightly spaced from the bottom surface of said first member and made of a metallic material not easily weldable to the material of said first member; and connecting means between the surfaces of said first and said second members, said connecting means comprising a first component of a metallic material easily weldable to the material of said first member and being formed with at least one protuberance extending beyond one of its surfaces and at least one aperture, a second substantially flat component of a metallic material easily weldable to the material of said second member and having at least one protuberance extending beyond one of its surfaces and at least one aperture so disposed that the protuberance of said first component extends therethrough and the protuberance of the second component extends through the aperture in said first component, said second component being adjacent to said first member and having its protuberance welded to said second member, and said first component being adjacent to said second member and having its protuberance welded to said first member.

2. A welded structure comprising, in combination, a first member made of a metallic material and having a substantially plane surface; a second member having a substantially plane surface slightly spaced from the surface of said first member and made of a metallic material not easily weldable to the material of said first member; and connecting means between the surfaces of said first and said second members, said connecting means comprising a first substantially flat discoid component of a metallic material easily weldable to the material of said first member and being formed with at least one protuberance extending beyond one of its surfaces and at least one aperture, a second substantially flat discoid component of a metallic material easily weldable to the material of said second member and having at least one protuberance extending beyond one of its surfaces and at least one aperture so disposed that the protuberance of said first component extends therethrough and the protuberance of the second component extends through the aperture in said first component, said second component being adjacent to said first member and having its protuberance welded to said second member, and said first component being adjacent to said second member and having its protuberance welded to said first member.

3. A welded structure comprising, in combination, a first member made of a metallic material and having a substantially plane surface; a second member having a substantially plane surface slightly spaced from the surface of said first member and made of a metallic material not easily weldable to the material of said first member; and connecting means between the surfaces of said first and said second members, said connecting means comprising a first substantially flat component of a metallic material easily weldable to the material of said first member, at least one protuberance extending beyond one of its surfaces and at least one aperture, a second substantially flat component of a metallic material easily weldable to the material of said second member and having at least one protuberance extending beyond one of its surfaces and at least one aperture so disposed that the protuberance of said first component extends therethrough and the protuberance of the second component extends through the aperture in said first component, said second component being adjacent to said first member and having its protuberance welded to said second member, and said first component being adjacent to said second member and having its protuberance welded to said first member, said connecting means extending beyond one of said members and defining a receptacle for at least partially receiving same.

4. A welded structure comprising, in combination, a first member made of a metallic material and having a substantially plane surface; a second member having a substantially plane surface slightly spaced from the surface of said first member and having a recess in said surface, said second member being made of a metallic material not easily weldable to the material of said first member; and a composite connecting member comprising a first substantially flat component of a metallic metal easily weldable to the material of said second member and having a first surface adjacent to said surface of said first member, a second surface facing said surface of said second member, at least one projection extending from the second surface of said first component and welded to said second member and a portion extending from its second surface into said recess in the second member, said first component being formed with at least one aperture therethrough, said connecting means further comprising a second substantially flat component made of a material easily weldable to the material of said first member and having a first surface adjacent to the surface of said second member, a second surface adjacent to the second surface of said first component, a projection extending through said aperture in said first component and welded to said first member, said second component being formed with an opening through which the portion of said first component extends into the recess in said second member, and an aperture through which the projection of said first component extends.

5. A welded structure comprising, in combination, a first member made of a metallic material and having a substantially plane surface; a second member having a substantially plane surface slightly spaced from the surface of said first member and having a recess in said surface, said second member being made of a metallic material not easily weldable to the material of said first member; and a composite connecting member comprising a first substantially flat component of a metallic metal easily weldable to the material of said second member and having a first surface adjacent to said surface of said first member, a second surface facing said surface of said second member, at least one projection extending from the second surface of said first component and welded to said second member and a portion extending from its second surface into said recess in the second member, said first component being formed with at least one aperture therethrough, said connecting means further comprising a second substantially flat component made of a material easily weldable to the material of said first member and having a first surface adjacent to the surface of said second member, a second surface adjacent to the second surface of said first component, a projection extending through said aperture in said first component and welded to said first member, said second component being formed with an opening through which the portion of said first component extends into the recess in said second member, and an aperture through which the projection of said first component extends, said second component further comprising a peripheral flange at least partially surrounding said first member.

6. A welding connector for connecting two metallic bodies of different welding characteristics comprising, in combination, a first substantially flat connecting member made of metallic material and being formed with at least one aperture and at least one projection extending out of the plane of said first connecting member; and a second substantially flat connecting member of a material not easily weldable to the material of said first connecting member, said second connecting member being formed with at least one projection protruding through the aperture in said first connecting member and with at least one aperture through which the projection of said first connecting member protrudes, said connecting members being respectively made from material easily weldable to said metallic bodies, respectively, so that the projection on one connecting member may be welded to one of the bodies and the projection on the other connecting member to the other body, whereby a secure welding connection between the two bodies can be obtained without welding the connecting members to each other.

7. A welding connector for connecting two metallic bodies of different welding characteristics comprising, in combination, a first substantially flat connecting member made of sheet material and being formed with at least one aperture and at least one projection extending out of the plane of said first connecting member; and a second substantially flat connecting member made of aluminum, said second connecting member being formed with at least one projection protruding through the aperture in said first connecting member and with at least one aperture through which the projection of said first connecting member protrudes, said connecting members being respectively made from material easily weldable to said metallic bodies, respectively, so that the projection on one connecting member may be welded to one of the bodies and the projection on the other connecting member to the other body, whereby a secure welding connection between the two bodies can be obtained without welding the connecting members to each other.

8. A welding connector for connecting two metallic bodies of different welding characteristics comprising, in combination, a first substantially flat connecting member made of sheet material and being formed with at least one aperture and at least one projection extending out of the plane of said first connecting member; and a second substantially flat connecting member made of copper, said second connecting member being formed with at least one projection protruding through the aperture in said first connecting member and with at least one aperture through which the projection of said first connecting member protrudes, said connecting members being respectively made from material easily weldable to said metallic bodies, respectively, so that the projection on one connecting member may be welded to one of the bodies and the projection on the other connecting member to the other body, whereby a secure welding connection between the two bodies can be obtained without welding the connecting members to each other.

References Cited in the file of this patent

UNITED STATES PATENTS

| | | |
|---|---|---|
| 904,540 | Lachman | Nov. 24, 1908 |
| 1,509,384 | Walter et al. | Sept. 23, 1924 |
| 2,191,632 | Smith | Feb. 27, 1940 |
| 2,703,912 | Tinnerman et al. | Mar. 15, 1955 |
| 2,730,381 | Curtiss | Jan. 10, 1956 |
| 2,747,166 | Hoffarth | May 22, 1956 |
| 2,912,075 | Pfistershammer | Nov. 10, 1959 |